(12) United States Patent
Watanabe et al.

(10) Patent No.: US 10,244,293 B2
(45) Date of Patent: *Mar. 26, 2019

(54) INFORMATION PROCESSING APPARATUS, INFORMATION PROCESSING METHOD, AND PROGRAM

(71) Applicant: SONY CORPORATION, Tokyo (JP)

(72) Inventors: Akihiro Watanabe, Kanagawa (JP); Motoki Tsunokawa, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,805

(22) Filed: Dec. 15, 2017

(65) Prior Publication Data

US 2018/0109853 A1 Apr. 19, 2018

Related U.S. Application Data

(63) Continuation of application No. 15/113,301, filed as application No. PCT/JP2014/081430 on Nov. 27, 2014, now Pat. No. 9,848,253.

(30) Foreign Application Priority Data

Mar. 3, 2014 (JP) ................................ 2014-040840

(51) Int. Cl.
H04N 5/765 (2006.01)
H04N 5/77 (2006.01)
(Continued)

(52) U.S. Cl.
CPC ............ *H04Q 9/00* (2013.01); *G06F 13/385* (2013.01); *H04L 12/282* (2013.01);
(Continued)

(58) Field of Classification Search
CPC .............. G06F 13/385; H04L 12/2805; H04L 12/282; H04L 2012/285; H04L 2012/2849;
(Continued)

(56) References Cited

U.S. PATENT DOCUMENTS 9,509,753 B2 * 11/2016 Park ...................... H04L 67/025
2006/0271993 A1 * 11/2006 Nakata ................. H04L 12/2805
725/131
2007/0224975 A1 9/2007 Jendbro et al.

FOREIGN PATENT DOCUMENTS

EP 2168399 A1 3/2010
EP 2168399 B1 1/2011
(Continued)

OTHER PUBLICATIONS

Jul. 3, 2018, Japanese Office Action issued for related JP Application No. 2016-506085.
(Continued)

*Primary Examiner* — Robert Chevalier
(74) *Attorney, Agent, or Firm* — Paratus Law Group, PLLC

(57) ABSTRACT

There is provided an information processing apparatus to allow a user to use a device network by a natural and simple operation by automatically selecting a device for providing a response to a request, the information processing apparatus including: a request acquiring part configured to acquire a request to a system; a response determining part configured to determine a response to the request; a device selecting part configured to select, on the basis of at least an attribute of the response, a device that provides the response among devices included in the system; and a device controller configured to perform control that causes the selected device to provide the response.

16 Claims, 7 Drawing Sheets

(51) Int. Cl.
*H04Q 9/00* (2006.01)
*G06F 13/38* (2006.01)
*H04L 12/28* (2006.01)
*H04N 21/41* (2011.01)
*H04N 21/422* (2011.01)
*H04N 21/439* (2011.01)

(52) U.S. Cl.
CPC ..... *H04L 12/2805* (2013.01); *H04N 21/4122* (2013.01); *H04N 21/4126* (2013.01); *H04N 21/4131* (2013.01); *H04N 21/42203* (2013.01); *H04N 21/42222* (2013.01); *H04N 21/4396* (2013.01); *H04L 2012/285* (2013.01); *H04L 2012/2849* (2013.01); *H04Q 2209/10* (2013.01)

(58) Field of Classification Search
CPC .. H04Q 9/00; H04Q 2209/10; H04N 21/4396; H04N 21/42222; H04N 21/42203; H04N 21/4131; H04N 21/4126; H04N 21/4122
USPC ........ 386/200, 223, 226, 230, 235, 247, 248
See application file for complete search history.

(56) References Cited

FOREIGN PATENT DOCUMENTS

| | | | |
|---|---|---|---|
| GB | 2378779 | A | 2/2003 |
| JP | 11-311996 | | 11/1999 |
| JP | 2000-215598 | * | 8/2000 |
| JP | 2002-132292 | A | 5/2002 |
| JP | 2002-525942 | A | 8/2002 |
| JP | 2004-304228 | | 10/2004 |
| JP | 2005-110205 | A | 4/2005 |
| JP | 2005-303423 | | 10/2005 |
| JP | 2005-531206 | A | 10/2005 |
| JP | 2006-324876 | | 11/2006 |
| JP | 2007-235613 | A | 9/2007 |
| JP | 2007-318319 | A | 12/2007 |

OTHER PUBLICATIONS

Sep. 27, 2017, EP communication issued for related EP application No. 14884408.7.
Schulzrinne, et al., "Ubiquitous Computing in Home Networks", IEEE communications Magazine, Nov. 2003, pp. 128-135.
Oct. 16, 2018, Japanese Office Action issued for related JP application No. 2016-506085.

* cited by examiner

FIG.5

| ID | DEVICE TYPE | PLACE | PLACE-DETAIL | OWNER | FUNCTION | FUNCTION-DETAIL |
|---|---|---|---|---|---|---|
| 1 | TV | LIVING ROOM | X: Y: Z: | SHARED | VIDEO, AUDIO | VIDEO: XXX, AUDIO: YYY, MICROPHONE: ZZZ, NETWORK: Wi-fi |
| 2 | Tablet | LIVING ROOM | | SHARED | VIDEO, AUDIO, CONPUTING | |
| 3 | Loud speaker | LIVING ROOM | | SHARED | AUDIO | |
| 4 | Lighting | LIVING ROOM | | SHARED | LIGHTING | |
| 5 | Personal Computer | STUDY | | FATHER | VIDEO, AUDIO, CONPUTING | |
| 6 | TV | BEDROOM | | SHARED | VIDEO, AUDIO | |
| 7 | Loud speaker | BEDROOM | | SHARED | AUDIO | |
| 8 | Loud speaker | BATHRROOM | | SHARED | AUDIO | |
| 9 | Tablet | KITCHEN | | SHARED | VIDEO, AUDIO, CONPUTING, TOUCH INPUT | |
| 10 | Smartphone | (MOBILE) | | FATHER | VIDEO, AUDIO, CONPUTING, TOUCH INPUT | |

INFORMATION PROCESSING APPARATUS, INFORMATION PROCESSING METHOD, AND PROGRAM

CROSS REFERENCE TO PRIOR APPLICATION

This application is a continuation of U.S. patent application Ser. No. 15/113,301 (filed on Jul. 21, 2016), which is a National Stage Patent Application of PCT International Patent Application No. PCT/JP2014/081430 (filed on Nov. 27, 2014) under 35 U.S.C. § 371, which claims priority to Japanese Patent Application No. 2014-040840 (filed on Mar. 3, 2014), which are all hereby incorporated by reference in their entirety.

TECHNICAL FIELD

The present disclosure relates to an information processing apparatus, an information processing method, and a program.

BACKGROUND ART

In recent years, smart household appliances having an information processing function and a network communication function have prevailed widely. There are being constructed systems that support the user's life by controlling smart household appliances, information processing terminals such as smartphones, tablet terminals or personal computers, or a network attached storage (NAS) via a home network. The techniques used by such systems are described in Patent Literature 1, for example.

CITATION LIST

Patent Literature

Patent Literature 1: JP H11-311996 A

SUMMARY OF INVENTION

Technical Problem

However, the device to be used in the network in a system such as those described above is determined by the user's choice. In other words, for example, when a plurality of loud speakers is connected to the home network, the user not only has to request playback of music, but also has to specify the loud speaker to be used to playback the music. In such a case, not only the operation for selection increases, but also the user may not be familiar with the names for specifying devices, which is not necessarily desirable in terms of making the user's operation for using the system more natural and simple.

Therefore, the present disclosure proposes a new and improved information processing apparatus, an information processing method, and a program that allow the user to use a device network by a natural and simple operation by automatically selecting a device for providing a response to a request.

Solution to Problem

According to the present disclosure, there is provided an information processing apparatus including: a request acquiring part configured to acquire a request to a system; a response determining part configured to determine a response to the request; a device selecting part configured to select, on the basis of at least an attribute of the response, a device that provides the response among devices included in the system; and a device controller configured to perform control that causes the selected device to provide the response.

According to the present disclosure, there is provided an information processing method including: acquiring a request to a system; determining a response to the request; selecting, on the basis of at least an attribute of the response, a device that provides the response among devices included in the system; and performing control that causes the selected device to provide the response.

According to the present disclosure, there is provided a program for causing a computer to achieve: a function of acquiring a request to a system; a function of determining a response to the request; a function of selecting, on the basis of at least an attribute of the response, a device that provides the response among devices included in the system; and a function of performing control that causes the selected device to provide the response.

Advantageous Effects of Invention

According to the aforementioned disclosure, the user can use a device network by a natural and simple operation by automatically selecting a device for providing a response to a request.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 5 illustrates an example of a device information DB in an embodiment of the present disclosure.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that, description will be provided in the following order.

1. Configuration example according to one embodiment
   1-1. Configuration example of system
   1-2. Configuration examples of devices
   1-3. Configuration example of agent function
   1-4. Examples of device information
2. Examples of specific use forms
   2-1. First example
   2-2. Second example
   2-3. Other examples
3. Hardware Configuration
4. Supplement (1. Configuration Example According to One Embodiment)

(1-1. Configuration Example of System)

Figure 1:
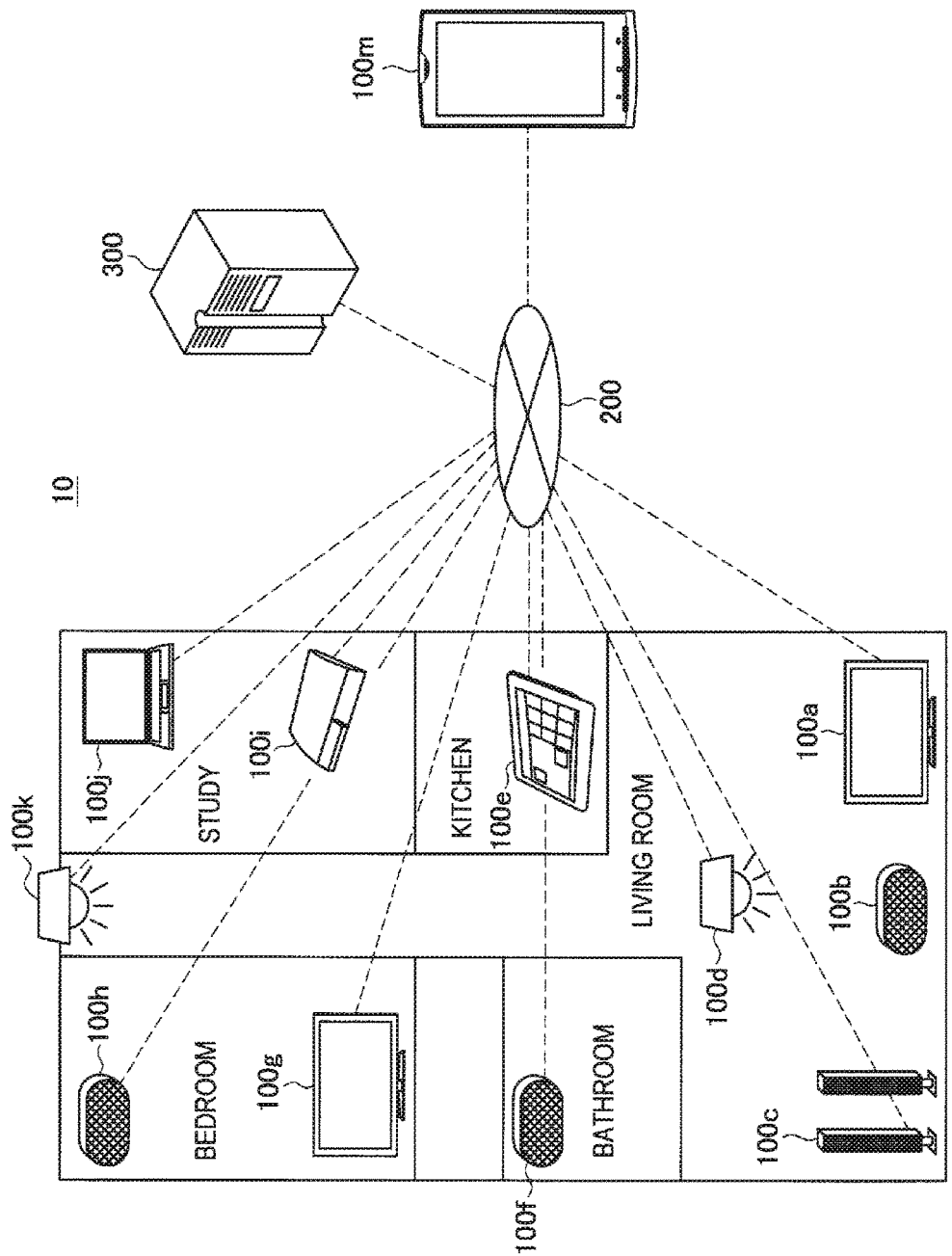
FIG. 1 is a diagram showing a configuration example of a system according to an embodiment of the present disclosure.

FIG. 1 is a diagram showing a configuration example of a system according to an embodiment of the present disclosure. Referring to FIG. 1, a system 10 includes an electronic device 100 and a network 200 to which the electronic device 100 is connected. The system 10 may tither include a server 300 connected to the network 200.

The electronic device 100 is a device used by a user. The system 10 may include multiple electronic devices 100. FIG. 1 shows, as examples of the electronic devices 100, TV 100a, a loud speaker 100b, a loud speaker 100c, a lighting apparatus 100d, a tablet 100e, a loud speaker 100f, a TV 100g, a loud speaker 100h, a NAS 100i, a personal computer 100j, a lighting apparatus look, and a smartphone 100m. Examples of the electronic devices 100 are not limited to those devices, and may include any other devices that are connectable to the network 200 such as a media player, a printer, a game console, an air-conditioning device, and a refrigerator. Most of the electronic devices 100, such as from the TV 100a to the personal computer 100j mentioned above, may be placed inside the home (for example, living room, bedroom, and study), or may be carried outside the home like the smartphone 100m.

The network 200 is a wireless and/or wired network that connects the electronic devices 100 to each other. For example, the network 200 includes a LAN to which each of the devices placed inside the home is connected. Further, the network 200 may include the Internet, a mobile telephone network, and the like, to which the smartphone 100m that is carried outside the home and the server 300 are connected.

The server 300 provides an electronic device 100 with a service through the network 200. The server 300 is achieved by an information processing apparatus connected to the network 200, for example. The functions of the server 300 to be described later may be achieved by a single information processing apparatus, or may be achieved in cooperation with multiple information processing apparatuses connected through a wired or wireless network.

In the present embodiment, the system 10 has achieved therein a function of automatically selecting a device for providing a response to a user's request acquired by any of the electronic devices 100. In the shown example, the electronic device 100 on the network 200 is controlled by an agent function achieved by either the server 300 or the electronic device 100, for example. The agent function extracts a user's request from a user's instruction input (for example, an audio input) acquired by the TV 100a, for example, and determines a response to the request.

Here, although the response may be provided to the user himself/herself who has issued the request, the choice of devices that provide the response is not limited to one. For example, when playback of music is instructed to the TV 100a, located in the living room, the music may be played back using a loud speaker built in the TV 100a, or the music may be played back using the loud speaker 100b or the loud speaker 100c which is also located in the living room. Therefore, the agent function has to select one of the electronic devices 100 supposed to provide the response.

In addition, when a response is provided to a different user from the user who has issued the request, the choice of devices that provide a response may further increase. For example, when a user being away from home asks a smartphone 100m to tell a family member at home to take in the laundry, appropriate selection of a device, from the TV 100a to the personal computer 100j, to provide information differs depending on where the family member is located.

As thus described, it is not necessarily easy for an agent function in the system 10 to select a device for providing a response to the user's request. However, it is troublesome for the user to specify the loud speaker to be used when playing back music, for example. In addition, a user being away from home does not know the location of a family member at home and therefore it is difficult to specify a device for providing information.

In the present embodiment, therefore, an agent function automatically selects a device which is suitable for providing a response, on the basis of the attribute of the response determined to the request. Accordingly, the user is relieved of the requirement to always specify a device when inputting a request to the agent function. In addition, the user can leave the selection of the device to the agent function when the user does not know which device is suitable for providing a response.

(1-2. Configuration Examples of Devices)

Figure 2:
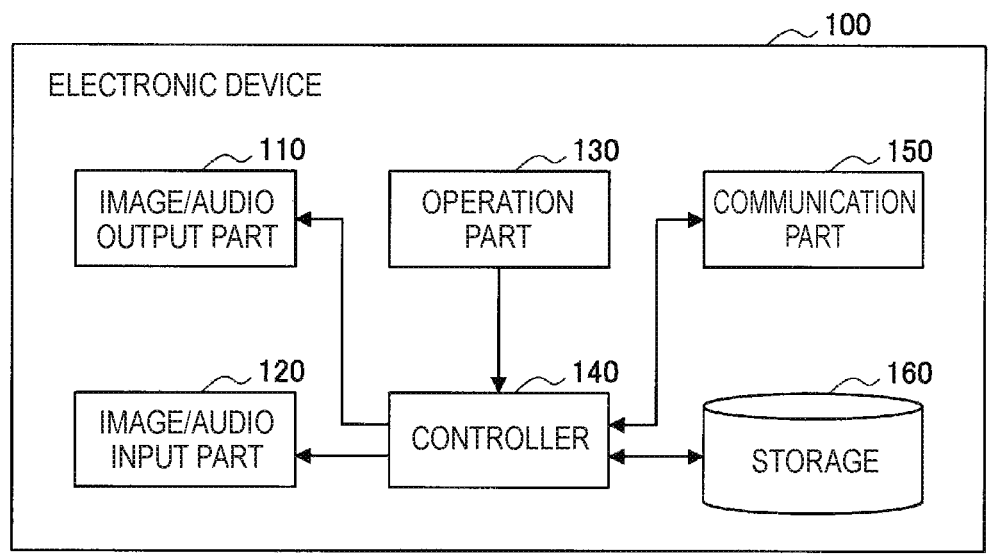
FIG. 2 is a block diagram showing a configuration example of an electronic device according to an embodiment of the present disclosure.

FIG. 2 is a block diagram showing a configuration example of an electronic device according to an embodiment of the present disclosure. Referring to FIG. 2, an electronic device 100 may include an image/audio output part 110, an image/audio input part 120, an operation part 130, a controller 140, a communication part 150, and a storage 160. Note that the configuration shown in the figure is simplified for the description of the present embodiment, and the electronic device 100 may further include structural elements that are not shown in the figure. It should be noted that, since the structural elements that are not shown in the figure may already be known as general structural elements of each device, and hence, the detailed explanation is omitted here.

The image/audio output part 110 may be achieved by a display that outputs an image and a loud speaker that outputs an audio, for example. The display may be, for example, a liquid crystal display (LCD) or an organic electro-luminescence (EL) display, and displays electronically various types of images in accordance with control performed by the controller 140. Note that, in the present specification, "images" include still images and motion images. The loud speaker outputs various types of audios in accordance with control performed by the controller 140. Note that the image/audio output part 110 may output one of the image and the audio depending on the type of the electronic device 100, or the image/audio output part 110 may not be mounted.

The image/audio input part 120 may be achieved by a camera that acquires an image and a microphone that acquires an audio, for example. The camera electronically captures a real space using an image sensor such as a complementary metal oxide semiconductor (CMOS) and generates image data. The microphone records an audio such as user's utterances and generates the audio data, for example. The generated image and/or audio data is provided to the controller 140. Note that the image/audio input part 120 may output one of the image and the audio depending on the type of the electronic device 100. Alternatively, the image/audio input part 120 may not be provided.

The operation part 130 may be achieved by a touch panel, a keyboard, a mouse, a key pad, or a button, which acquires user's operation, for example. Information indicating the user's operation acquired by the operation part 130 is provided to the controller 140. In the electronic device 100, the user's instruction input may be acquired through the operation part 130, or may be acquired through the image/audio input part 120 as an audio or a gesture. Accordingly, in the case where the electronic device 100 acquires the user's instruction input mainly by the operation part 130, the image/audio input part 120 may not be provided, and, on the contrary, in the case where the electronic device 100 acquires the instruction input mainly by the image/audio input part 120, the operation part 130 may not be provided.

The controller 140 may be achieved by a processor such as a central processing unit (CPU) and/or a digital signal processor (DSP) operating in accordance with a program stored in the storage 160. The controller 140 controls operations of the respective parts of the electronic device 100. For example, the controller 140 controls the image/audio output part 110 so as to output an image and/or an audio received through the communication part 150 or read from the storage 160. Further, the controller 140 controls the image/audio input part 120 so as to acquire the image data and/or the audio data, processes the acquired data as necessary, and transmits the data through the communication part 150 or store the data in the storage 160. The controller 140 may execute those controls in accordance with the user's instruction input acquired through the operation part 130 or the image/audio input part 120, for example.

The communication part 150 is a communication interface that supports wireless and/or wired communication scheme which configures the network 200. The communication part 150 may include, for example, a communication circuit, and an antenna or a port. Through the communication part 150, the controller 140 exchanges various types of information with another electronic device 100 on the network 200 or with the server 300.

The storage 160 may be achieved by semiconductor memory or a hard disk, for example. The storage 160 stores various types of data used in the electronic device 100 or generated in the electronic device 100. The storage 160 has a temporary storage area, and may temporarily store a program being executed by the controller 140, data acquired by the image/audio input part 120, and data received by the communication part 150. Further, the storage 160 has a permanent storage area, and may store a program to be executed by the controller 140, various types of setting data, local content data output from the image/audio output part 110, data which is acquired by the image/audio input part 120 and which the operation part 130 gives instructions to store, and the like.

Figure 3:
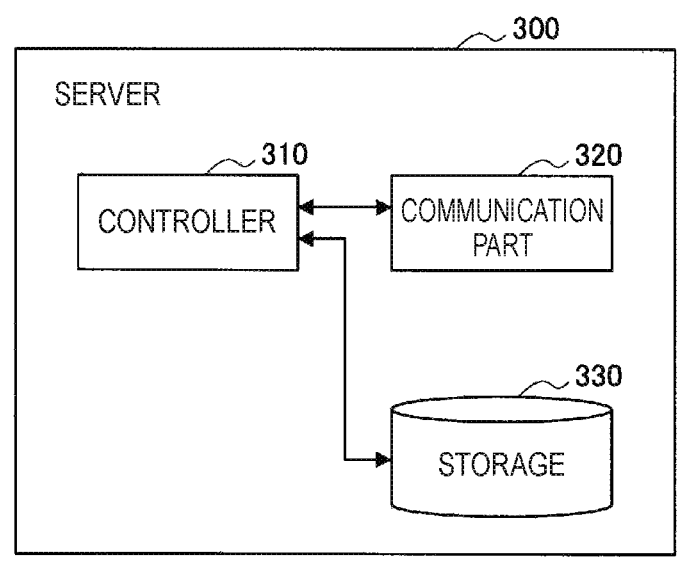
FIG. 3 is a block diagram showing a configuration example of a server according to an embodiment of the present disclosure.

FIG. 3 is a block diagram showing a configuration example of a server according to an embodiment of the present disclosure. Referring to FIG. 3, the server 300 may include a controller 310, a communication part 320, and a storage 330. Note that the configuration shown in the figure is simplified for the description of the present embodiment, and the server 300 may further include structural elements that are not shown in the figure. It should be noted that, since the structural elements that are not shown in the figure may already be known as general structural elements of the server, and hence, the detailed explanation is omitted here. Further, as described above, the server 300 may be achieved by a single information processing apparatus, or may be achieved in cooperation with multiple information processing apparatuses. Accordingly, the structural elements shown in the figure may be achieved by multiple information processing apparatuses dispersedly.

The controller 310 may be achieved by a processor such as a CPU and/or a DSP operating in accordance with a program stored in the storage 330. The controller 310 controls operations of the respective parts of the server 300. For example, the controller 310 refers to setting information and the like stored in the storage 330 as necessary and transmits information to the electronic device 100 on the network 200 through the communication part 320. The information may include a command to cause the electronic device 100 to execute a given operation. Further, the controller 310 transmits to another electronic device 100 information that may include a command on the basis of the result obtained by processing the information received from the electronic device 100 through the communication part 320. Alternatively, the controller 310 may update information such as setting information stored in the storage 330 on the basis of the results obtained by processing the information received from the electronic device 100 through the communication part 320.

The communication part 320 is a communication interface that supports wireless and/or wired communication scheme which configures the network 200. The communication part 320 may include, for example, a communication circuit, and a port or an antenna. Through the communication part 320, the controller 310 exchanges various types of information with an electronic device 100 on the network 200.

The storage 330 may be achieved by semiconductor memory or a hard disk, for example. The storage 330 stores various types of data used in the server 300 or generated in the server 300. The storage 330 has a temporary storage area, and may temporarily store a program being executed by the controller 310, data received by the communication part 320 from the electronic device 100, and data generated by the controller 310. Further, the storage 330 has a permanent storage area, and may store a program to be executed by the controller 310 and various types of setting data.

(1-3. Configuration Examples of Agent Function)

Figure 4:
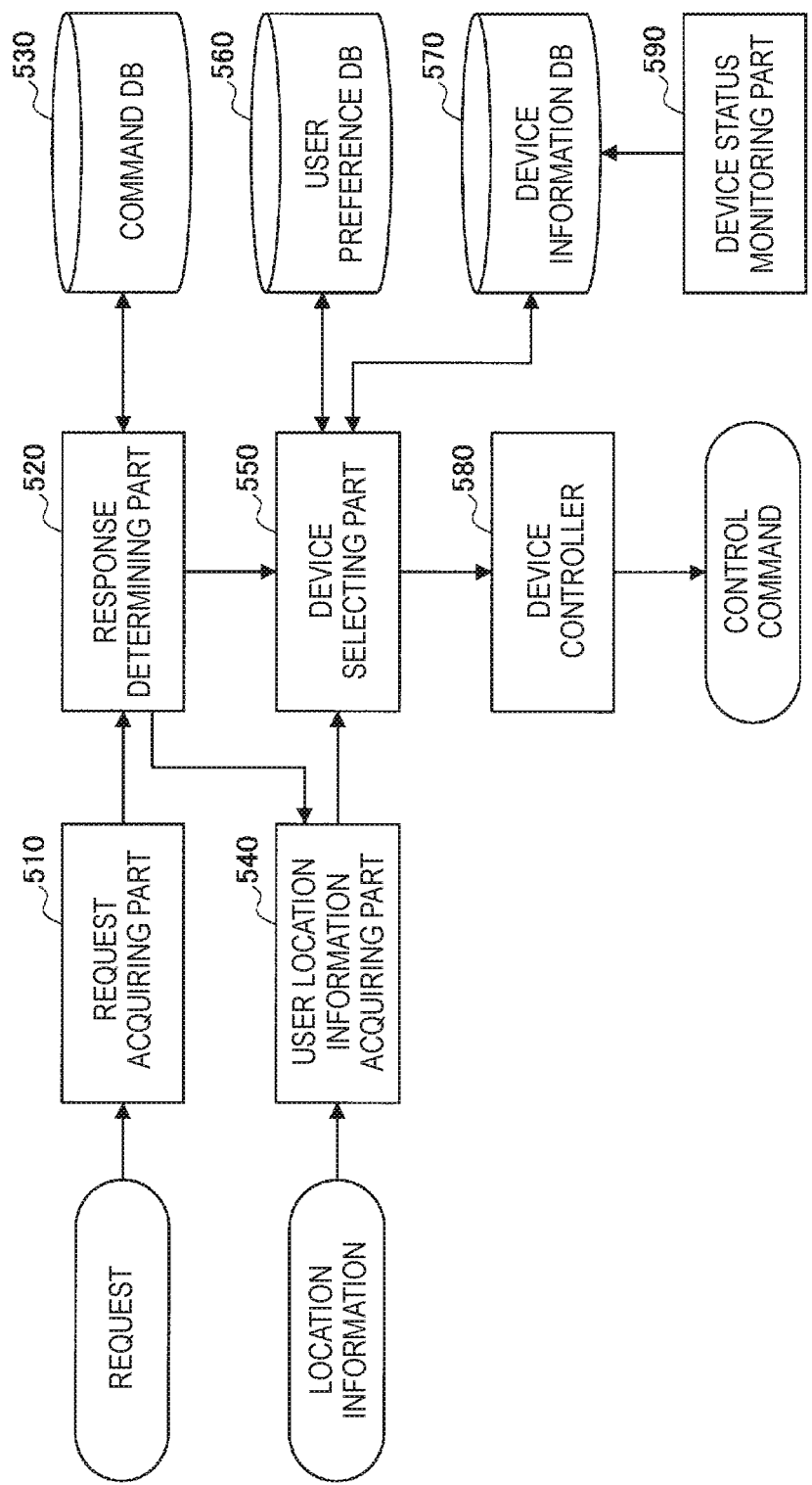
FIG. 4 is a block diagram showing a functional configuration example of an agent according to an embodiment of the present disclosure.

FIG. 4 is a block diagram showing a configuration example of an agent function in an embodiment of the present disclosure. Referring to FIG. 4, the agent function includes a request acquiring part 510, a response determining part 520, a device selecting part 550, and a device controller 580. The agent function may further include a user location information acquiring part 540 and a device status monitoring part 590. In addition, the agent function may refer to a command DB 530, a user preference DB 560, and a device information DB 570. These components are achieved by the controller 310 and the storage 330 of the aforementioned server 300, for example. Alternatively, the aforementioned components may be achieved by the controller 140 and the storage 160 of any of the electronic devices 100 (for example, the TV 100a and the smartphone 100m). In addition, the aforementioned components may be achieved by the electronic device 100 and the server 300 in a distributed manner.

Note that, in the case where the electronic device 100 can achieve the functions of the agent, the system 10 may not include the server 300. Alternatively, the functions of the agent may be achieved by the server 300 and also by the electronic device 100. In the case where the server 300 is communicable with the network 200, the functions of the agent may be achieved by the server, and otherwise by the electronic device 100 instead. Hereinafter, respective components will be described in further detail.

(Request Acquiring Part)

The request acquiring part 510 acquires a request from a user to the system 10. The request from the user is input to any of the electronic devices 100. For example, the request from the user is input as audio data using a microphone included in the image/audio input part 120 of the electronic device 100. In such a case, the user's request may include uttered voice. Alternatively, the request from the user may be input as image data using the camera included in the image/audio input part 120 of the electronic device 100. In such a case, a user's request may include a gesture image. In addition, the request from the user may be input via the operation part 130 of the electronic device 100. When the agent function is achieved by the server 300, or an electronic device 100 which is different from the electronic device 100 to which the request has been input, the request acquiring part 510 receives the request via the network 200.

(Response Determining Part)

The response determining part 520 determines a response to the request acquired by the request acquiring part 510. For example, when the request has been acquired as audio data including uttered voice, the response determining part 520 performs voice recognition processing and extracts the content of uttered voice as a text, for example. Furthermore, the response determining part 520 determines a command indicated by the user's uttered voice and a response to the command, referring to the command DB 530 on the basis of the extracted text. In addition, for example, when the request has been acquired as image data including a gesture image, the response determining part 520 performs image recognition processing, and extracts the content of the gesture. Furthermore, the response determining part 520 determines a command indicated by the user's gesture and a response to the command, referring to the command. DB 530 on the basis of the content of the extracted gesture.

Here, the response determined by the response determining part 520 may include any function that can be achieved by using one, or a combination, of the electronic devices 100. For example, the response may be an audio output using the electronic device 100 including a loud speaker in the image/audio output part 110. In such a case, the audio output may be music content, for example, or may be a voice message providing certain information. In addition, the response may be an image output using the electronic device 100 including a display in the image/audio output part 110. In such a case, the image output may be an image content, for example, or may be a notification image providing certain information. Furthermore, the response may be made such that the electronic device 100 having specific functions, such as a lighting apparatus, a printer, an air conditioner, or a refrigerator, for example, performs adjusting or turning on/off of the respective functions. Note that, the act of providing a response to the user's request by the agent function is in itself a known technique and therefore it is also possible in the present embodiment to apply such examples of request and response.

In addition, the response determined by the response determining part 520 may be intended to be provided to any of the users using the system 10. When the response is made by outputting audio or providing an image, for example, the response determining part 520 determines to which user the audio or image is provided. The response determining part 520 may extract information indicating the target user from the content of text or gesture extracted from the request, for example. Alternatively, the response determining part 520 may identify the user located closest to the electronic device 100 to which the request has been input (identified by the user location information acquiring part 540), as the target to whom the response is to be provided.

(User Location Information Acquiring Part)

The user location information acquiring part 540 acquires location information of the user relating to the response determined by the response determining part 520. For example, the user location information acquiring part 540 may acquire user location information to which the response is to be provided. Alternatively, the user location information acquiring part 540 may acquire location information of a user who has input the request (may be the same target user to whom the response is to be provided). The user location information is acquired using, for example, a global positioning system (GPS) receiver of the smartphone 100*m*. in addition, when the user is at home, it is also possible to acquire the detailed user location information using a home sensor network or the like. Alternatively, the user location information may be acquired on the basis of analysis of the image or audio acquired by the image/audio output part 110 of the electronic device 100, the login status to the service using the electronic device 100, or the like. In such a case, the location information may be provided in association with each of the electronic devices 100.

(Device Selecting Part)

The device selecting part 550 selects, among a group of devices available to the user, a device that provides a response, with regard to the response determined by the response determining part 520 and on the basis of at least the attribute of the response. In the present embodiment, the group of devices available to the user is the electronic devices 100 included in the system 10. For example, at least a portion of the electronic devices 100 has owners set thereto and, when access to the electronic devices 100 is limited by the owners, the group of devices available to the user is the devices, among the electronic devices 100, to which the user has been granted the access rights. The device selecting part 550 may acquire information relating to the access rights of the electronic devices 100 from the device information DB 570, Here, for example, the attribute of the response includes the target to whom the response is to be provided, and the device selecting part 550 may select a device that provides a response on the basis of the location of the target to whom the response is to be provided and the location of the device included in the system 10. The target user to whom the response is to be provided may be identified by the response determining part 520 as described above. In addition, the user location information may be acquired by the user location information acquiring part 540. The location information of the device included in the system 10 may be acquired from the device information DB 570, for example. More specifically, the device selecting part 550 may select, as the device that provides the response, one which is located close to the target among the electronic devices 100 capable of providing the response determined by the response determining part 520.

When, in the aforementioned example, there is a change in at least one of: the targets to which the response is to be provided, the location of the target, or the location of the electronic device 100, the device selecting part 550 may reselect a device that provides the response. In other words, the device selecting part 550 may dynamically change the electronic device 100 that provides the response when, for example, the target to whom the response is to be provided has been changed by a request newly acquired by the request acquiring part 510, or when the target user or the electronic device 100 that provides the response has moved during provision of the response.

In addition, for example, the attribute of a response may include a function achieved in the response, and the device selecting part 550 may select a device that provides the response, on the basis of the performance of the electronic device 100 relating to the function achieved in the response. The performance of the electronic device 100 with regard to the function may be acquired from the device information DB 570, for example. More specifically, the device selecting part 550 may select, as the device that provides the response, the electronic device 100 with the highest performance with regard to the function achieved in the response. For example, when the function to be achieved is provision of an image or audio, the device selecting part 550 performs a combination of selections using location information, and selects the electronic device 100 with the highest performance with regard to provision of an image or audio, from the electronic devices 100 in a predetermined range (for example, in the same room) on the basis of the location of the target user. Alternatively, when the function to be achieved is a function which does not necessarily have to be performed in the proximity of the user such as information search or image processing, the device selecting part 550 may simply select the electronic device 100 with the highest performance.

In the aforementioned example, the device selecting part 550 may select a plurality of devices as the device that provides the response. For example, the device selecting part 550 may cause the plurality of electronic devices 100 to simultaneously and concurrently provide the function to be achieved in the response. Alternatively, the device selecting part 550 may divide the function to be achieved in the response among the plurality of electronic devices 100 and cause the plurality of electronic devices 100 to provide the function. More specifically, when playback functions of image and audio are to be achieved in the response, the device selecting part 550 may cause different electronic devices 100 to provide the image playback function and the audio playback function. For example, in the case of the example of the system 10 shown in FIG. 1, the TV 100a may playback image, and the loud speaker 100c may playback audio. In this case, the TV 100a may be controlled to mute audio while playing back the image and audio.

In addition, for example, the device selecting part 550 may select a device that provides a response on the basis of the preference of the target user to whom the response is to be provided. As has been described above, the target user to whom the response is to be provided may be specified by the response determining part 520 as has been described above. In addition, the user's preference may be acquired from the user preference DB 560. The user preference DB 560 is generated on the basis of for example, the use history of the electronic devices 100 by each user using the system 10, information that has been explicitly input by each user, or the like. More specifically, the device selecting part 550 may select, as the device that provides the response, the electronic device 100 that best matches the preference of the target user to whom the response is to be provided.

Note that, the device selecting part 550 is not necessarily always capable of selecting a device that provides a response. For example, there may be a case where no selectable device is discovered, as a result of having applied a condition such as location, function and/or preference. In addition, there may be a case where it is difficult to select a device because the information included in the request acquired by the request acquiring part 510 is incomplete. In such a case, the device selecting part 550 may output a notification that no device will be selected, a request for additional information for selecting a device, or the like, by controlling the electronic device 100 via the device controller 580.

(Device Controller)

The device controller 580 performs a control that causes the device selected by the device selecting part 550 to provide the response determined by the response determining part 520. More specifically, the device controller 580 transmits a control command to the electronic device 100 via the network 200. In addition, for example, when the device selecting part 550 has failed to select a device that provides a response, the device controller 580 may control the electronic device 100 to notify that no device has been selected, or output a message requesting for additional information for selecting a device. In such a case, the message may be output from the electronic device 100 to which the request has been input. Alternatively, the device controller 580 may control the electronic device 100 to output a message notifying that a response has been provided in response to the request. In such a case, the electronic device 100 that provides the response is a different device from the electronic device 100 to which the request has been input, and the message may be output from the electronic device 100 to which the request has been input.

(Device Status Monitoring Part)

The device status monitoring part 590 monitors the electronic devices 100 included in the system 10, and updates the device information DB 570 as necessary. The device status monitoring part 590 updates the device information DB 570 in a case such as, for example, the electronic device 100 has been moved, provision of a function by the electronic device 100 has started or finished, or settings of the electronic device 100 have been changed.

(1-4. Examples of Device Information)

FIG. 5 illustrates an example of the device information DB in an embodiment of the present disclosure. Referring to FIG. 5, the device information DB 570 includes items of: ID 570a, device type 570b, place 570c, place-detail 570d, owner 570e, function 570f, and function-detail 570g. Note that, the content of the device information DB 570 in the illustrated example does not necessarily coincide with the example of the system 10 shown in FIG. 1. Hereinafter, respective items will be further described.

The ID 570a is used to identify each device information. The device type 570b indicates the type of the electronic device 100. For example, when the device selecting part 550 selects a device on the basis of the user's preference, the device type 570b may be used for the selection. More specifically, when a user's preference such as "prefers tablet to television when performing Web browsing" is indicated in the user preference DB 560, a tablet instead of a television may be selected on the basis of the device type 570b.

The place 570c indicates a general location of the electronic device 100. In the illustrated example, rooms in the house (living room, study, bedroom, etc.) are recorded as the place 570c. The place 570c is recorded on the basis of setting information input by the user, for example, when the electronic device 100 is installed. The place-detail 570d indicates details of the location of the electronic device 100. In the illustrated example, coordinates of three axes X, Y and Z are recorded as the place-detail 570*d*. The place-detail 570*d* is acquired using GPS or a home sensor network, for example.

Note that, the place 570*c* and the place-detail 570*d* may be different from each other, depending on the situation. For example, when a tablet in the living room has been temporarily moved to the bedroom, the place 570*c* remains to be "living room" as long as the setting information is not changed, but the place-detail 570*d* may be changed to the coordinates of the bedroom in accordance with the movement of the device. Alternatively, the place 570*c* may be changed together with the movement of the electronic device 100 in a case where the place 570*c* is set on the basis of the place-detail 570*d* instead of the setting information.

For example, when the device selecting part 550 selects a device on the basis of the location information of the electronic device 100, the place 570*c* and/or the place-detail 570*d* may be used for the selection. More specifically, the device selecting part 550 selects the electronic device 100 which is indicated by the place 570*c* or the place-detail 570*d* to be located near the target user to whom the response is to be provided. When the place 570*c* and/or the place-detail 570*d* has been changed because the electronic device 100 has been moved, the device selecting part 550 may dynamically change the device to be selected, and thereby the electronic device 100 may be newly selected as a device that provides a response or eliminated from the devices that provide a response.

The owner 570*e* indicates the owner of the electronic device 100 or a user accessible thereto. In the illustrated example, "shared" or "father" is set to the owner 570*e*. "Shared" indicates that there is no limitation on accessing the electronic device 100 and all the users using the system 10 (for example, all the family members) can use the electronic device 100. "Father" indicates that the access rights to the electronic device 100 are granted only to the father. It goes without saying that the access rights are not limited to the father but may be granted to the mother, children, or combinations thereof.

For example, when selecting a device that provides a response, the device selecting part 550 may first perform filtering of the device on the basis of the owner 570*e*. More specifically, the electronic device 100 may be excluded from the targets of selection unless both the user who has input the request and the target user of the response can use the electronic device 100. In addition, whether or not to include the electronic device 100 as a candidate of selection when only any one of the users can use the electronic device 100 can be determined in accordance with the settings by the user, or the type of function to be provided in the response.

The function 570*f* indicates the type of function that can be provided by the electronic device 100. The function-detail 570*g* indicates the specification of the electronic device 100 with regard to the function. The items may be acquired from a database on the network, on the basis of information such as the model number provided to the agent function when the electronic device 100 is added to the system 10, for example. For example, the device selecting part 550 may perform filtering on the basis of the function 570*f*, when selecting a device that provides a response. More specifically, the electronic device 100 which is not capable of achieving the function to be provided in the response may be excluded from the candidates of selection.

Furthermore, for example, when the device selecting part 550 selects a device on the basis of performance of the electronic device 100, the function-detail 570*g* may be used for the selection. More specifically, the device selecting part 550 may select, as a device that provides a response, the electronic device 100 which is indicated to have the highest performance with regard to the function to be achieved in a response, according to the function-detail 570*g*. In the illustrated example, the function-detail 570*g* may include further items, in addition to the items of video, audio, microphone, and network.

In addition, when a plurality of functions is to be achieved in the response, the device selecting part 550 may select the electronic devices 100 individually for each function, on the basis of the function-detail 570*g*. For example, when video and audio playback functions are to be achieved in the response, the device selecting part 550 may select a television with regard to the video playback function and a loud speaker with regard to the audio playback function, respectively, provided that the function-detail 570*g* indicates that the television has the highest performance with regard to the video playback function and the loud speaker has the highest performance with regard to the audio playback function.

Note that, the device information DB 570 may include various items other than the aforementioned examples. For example, the device information DB 570 may include items indicating the functions being provided by the electronic device 100. In addition, the device information DB 570 may include items indicated by the user who is using the electronic device 100.

Construction of the device information DB 570 such as the aforementioned example allows the device selecting part 550 to automatically select a device that provides a response, according to the agent function of the present embodiment.

(2. Examples of Specific Use Form)

(2-1. First Example)

Figure 6:
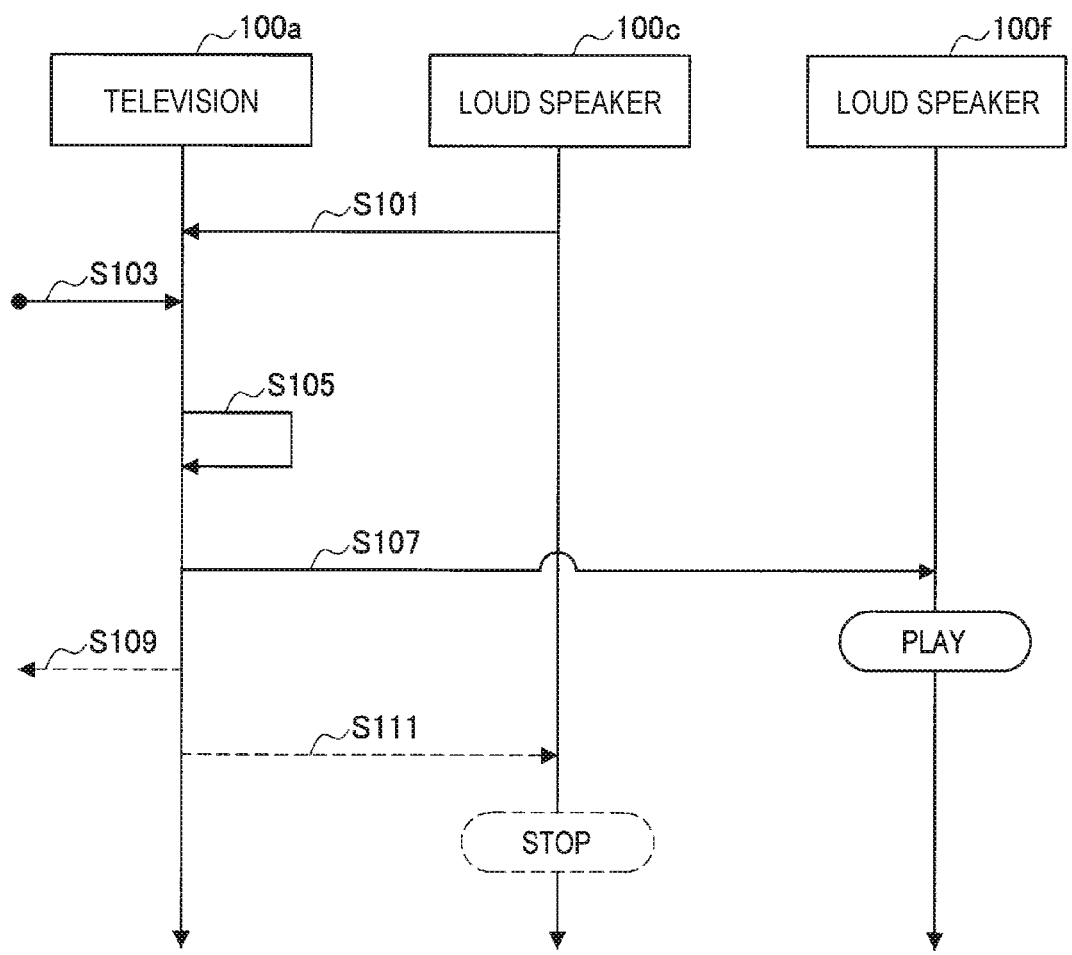
FIG. 6 is a sequence diagram showing a first example of a specific use form of an embodiment of the present disclosure.

FIG. 6 is a sequence diagram showing a first example of a specific use form of an embodiment according to the present disclosure. Referring to FIG. 6, in the system 10 shown in FIG. 1, the loud speaker 1.00*c* installed in the living room is playing back music. On this occasion, the loud speaker 100*c* notifies the TV 100*a* achieving the agent function that music content is being played back (S101). Upon receiving the notification, the device status monitoring part 590 in the TV 100*a* records the fact that the loud speaker 100*c* is playing back music content, as well as information for identifying the music content (stored in the NAS 100*i*, for example) being played back, in the device information DB 570, according to the agent function achieved by the controller 140.

Here, let us assume that the user has uttered "tell me the rest in the bathroom" into the TV 100*a* (S103). In the TV 100*a*, a microphone included in the image/audio input part 120 acquires the uttered voice, and the audio data output from the microphone is provided to the controller 140 achieving the agent function as the request from the user. In the agent function, the response determining part 520 determines a response on the basis of the aforementioned audio data acquired by the request acquiring part 510. The response determining part 520 analyzes the request by performing voice recognition or natural language processing, for example, to determine a response thereto. In the illustrated example, the response is to "keep, with a device in the bathroom, playing back the music content currently provided to the user". Note that, the controller 140 of the TV 100*a* may ask the server 300 to perform voice recognition or natural language processing via the network 200.

Furthermore, in the agent function, the device selecting part 550 selects a device that provides a response. In the illustrated example, the loud speaker 100*f* is selected because the place for providing the response is the bathroom and the function to be achieved in the response is playback of music content, (S105). The device controller 580 performs a control that causes the device selected by the device selecting part 550. i.e., the loud speaker 100f to provide the response. More specifically, the device controller 580 transmits a control command to the loud speaker 100f in the bathroom so as to continuously playback the music content having been played back by the loud speaker 100c in the living room until then (S107). The control command on this occasion may include information indicating the location of the music content (for example, the NAS 100i) and the location to start the playback.

Furthermore, after the control command has been transmitted to the loud speaker 100f, or an acknowledgement for the control command has been returned, the device controller 580 may notify, as an additional process, the user who has input the request to the TV 100a that the response (switchover of playback of the music content to the loud speaker in the bathroom) has been performed (S109). The notification may be output as an audio, or may be output as an image using GUI or the like. Subsequently, when it is detected that the user has moved from the living room, for example, using a sensor, a camera, or the like, the device controller 580 may transmit a control command to stop playing back the music content to the loud speaker 100c (S111).

(2-2. Second Example)

Figure 7:
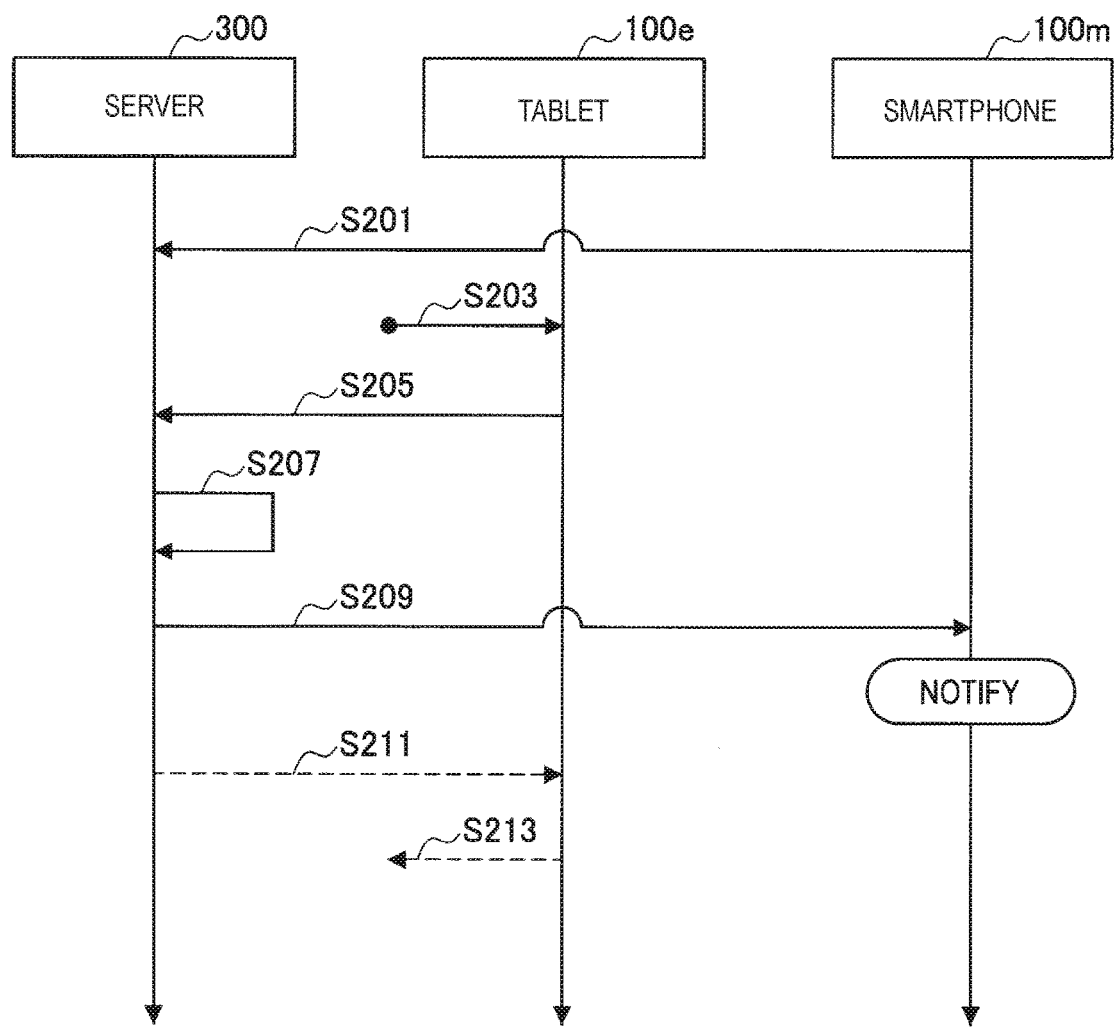
FIG. 7 is a sequence diagram showing a second example of a specific use form of an embodiment of the present disclosure.

FIG. 7 is a sequence diagram showing a second example of a specific use form of an embodiment of the present disclosure. Referring to FIG. 7, in the system 10 shown in FIG. 1, the smartphone 100m carried by a user (father) to the outside (workplace) regularly transmits location information to the server 300 achieving the agent function (S201). Here, let us assume that a user (mother) has uttered "tell dad to buy milk on his way home" into the tablet 100e in the house (S203). In the tablet 100e, a microphone included in the image/audio input part 120 acquires the uttered voice. The audio data output from the microphone is transmitted from the tablet 100e to the server 300 via the network 200 (S205).

In the server 300, the request acquiring part 510 of the agent function acquires the audio data, and the response determining part 520 determines a response on the basis of the audio data. Similarly to the aforementioned first example, the response determining part 520 performs voice recognition or natural language processing, for example, and determines a response to the user's request. In the illustrated example, the response is to "notify dad to buy milk". Furthermore, in the agent function, the device selecting part 550 selects a device that provides the response. In the illustrated example, the father is the target user to whom the response is to be provided and therefore the device selecting part 550 selects the electronic device 100 located closest to the father, i.e., the smartphone 100m carried by the father being away from home, as the device that provides the response (S207).

Subsequently, the device controller 580 performs a control that causes the smartphone 100m selected by the device selecting part 550 to provide the response. More specifically, the device controller 580 transmits a control command so that the smartphone 100m outputs a notification (S209). The control command on this occasion may include information indicating the content of the notification (request to buy milk on his way home) and the requester (the user who has input the request to the tablet 100e, i.e., the mother).

Furthermore, after the control command has been transmitted to the smartphone 100m, or an acknowledgement to the control command has been returned, the device controller 580 may notify, as an additional process, the user who has input the request to the tablet 100e that the response (notification to the father via the smartphone 100m) has been performed. (S211, S213). The notification may be output as an audio, or may be output as an image using GUI.

(2-3. Other Examples)

(Another Example—1)

A variety of examples are also possible without being limited to the examples shown in FIGS. 6 and 7 described above. For example, let us assume that a user has uttered "playback a movie on TV" into the TV 100a when the user wants to watch a movie on the TV 100a in the living room. On this occasion, the response determining part 520 determines a response in the agent function (achieved by the TV 100a, another electronic device 100, or the server 300, for example), on the basis of the request (audio data including the user's uttered voice) acquired by the request acquiring part 510. In the response of such a case, a function of "displaying images of the movie (video content)" and a function of "outputting audio of the movie (video content)" are achieved.

Accordingly, the device selecting part 550 selects a device having the highest performance with regard to the image display function and a device having the highest performance with regard to the audio output function, among the electronic devices 100 located in the living room. Specifically, the TV 100a and the loud speaker 100c are selected as devices having the highest performance with regard to image display and audio output, respectively. Here, the device selecting part 550 may further identify the location where the user is sitting down in the living room, and select the loud speaker 100c as the device capable of providing the most suitable audio for the location. Subsequent to such processing by the device selecting part 550, the device controller 580 transmits a control command to the TV 100a and the loud speaker 100c. The control command may include information indicating the method of acquiring the video content (for example, receiving broadcast wave using a tuner of the TV 100a, or reading from the NAS 100i). Furthermore, the control command transmitted to the TV 100a may include an instruction to mute the audio output of the video content.

(Another Example—2)

In addition, the agent function may be capable of providing a request with a response which is more complicated or activated after a while. For example, let us assume that the mother, when going out, provides an input to the microphone included in the lighting apparatus 100k at the entrance by uttering "tell my son when he returns home that there is a snack in the cupboard". In the agent function, on this occasion, although the request acquiring part 510 acquires the aforementioned audio input, and the response determining part 520 determines a response to the request (notification to the son), the son has not come home yet at the time point and therefore the user location information acquiring part 540 cannot acquire the location information of the son who is the target of the response.

In such a case, the device selecting part 550 determines that the response should be provided after a while on the basis of the content of the request "when he returns", for example, and puts off providing the response. Subsequently, when the son comes home, the user location information acquiring part 540 acquires the location information of the son from the analysis of images acquired by the camera included in the lighting apparatus 100k, for example. Accordingly, the device selecting part 550, which has determined that it has become possible to provide the response, selects the electronic device 100 located closest to the location of the son at the time point, i.e., the loud speaker 100b in the living room for example, as the device that provides the response, and the device controller 580 transmits a control command to output a voice notification "there is a snack in the cupboard" from the loud speaker 100b.

(Another Example—3)

In addition, the agent function does not necessarily have to acquire the user's explicit utterance, gesture, or operation as a request. The agent function may extract a request to the system 10 from a motion of the user (who is not particularly aware of operating the device) or a natural phenomenon. For example, in a case where rain which has begun to fall and laundry being hung appear in an image acquired by the electronic device 100 (not shown in FIG. 1) including a camera shooting the outside of a window, the request acquiring part 510 and the response determining part 520 may recognize the aforementioned phenomenon via image analysis, and automatically identify a virtual request "notify somebody in the house to take in the laundry" and a response corresponding thereto.

In such a case, the device selecting part 550 selects, as a device that provides a response, the electronic device 100 located close to a user (need not be identified) being in the house, on the basis of the location information acquired by the user location information acquiring part 540. For example, in a case where the user location information acquiring part 540 has detected that the father is in the study from analysis of an image acquired by the camera included in the personal computer 100j located in the study, the device selecting part 550 selects the personal computer 100j as the device that provides the response (notification). In such a case, the device controller 580 transmits a control command to output a voice notification "take in the laundry" from the loud speaker included in the personal computer 100j.

As has been described above, the agent function provided in an embodiment of the present disclosure allows the user to use a device network with a natural and simple operation, by automatically selecting a device for providing a response to a request in various situations within the system 10, for example.

Note that, although the system 10 including the electronic device 100 installed at home has been illustrated in the above described embodiments, the present technique can be applied without being limited to such examples. For example, a similar system can be built in an office or a car as with the case at home. In addition, the electronic devices available to the user may be distributed in various places such as at home, in an office or a car, instead of being centered at a particular place.

(3. Hardware Configuration)

Figure 8:
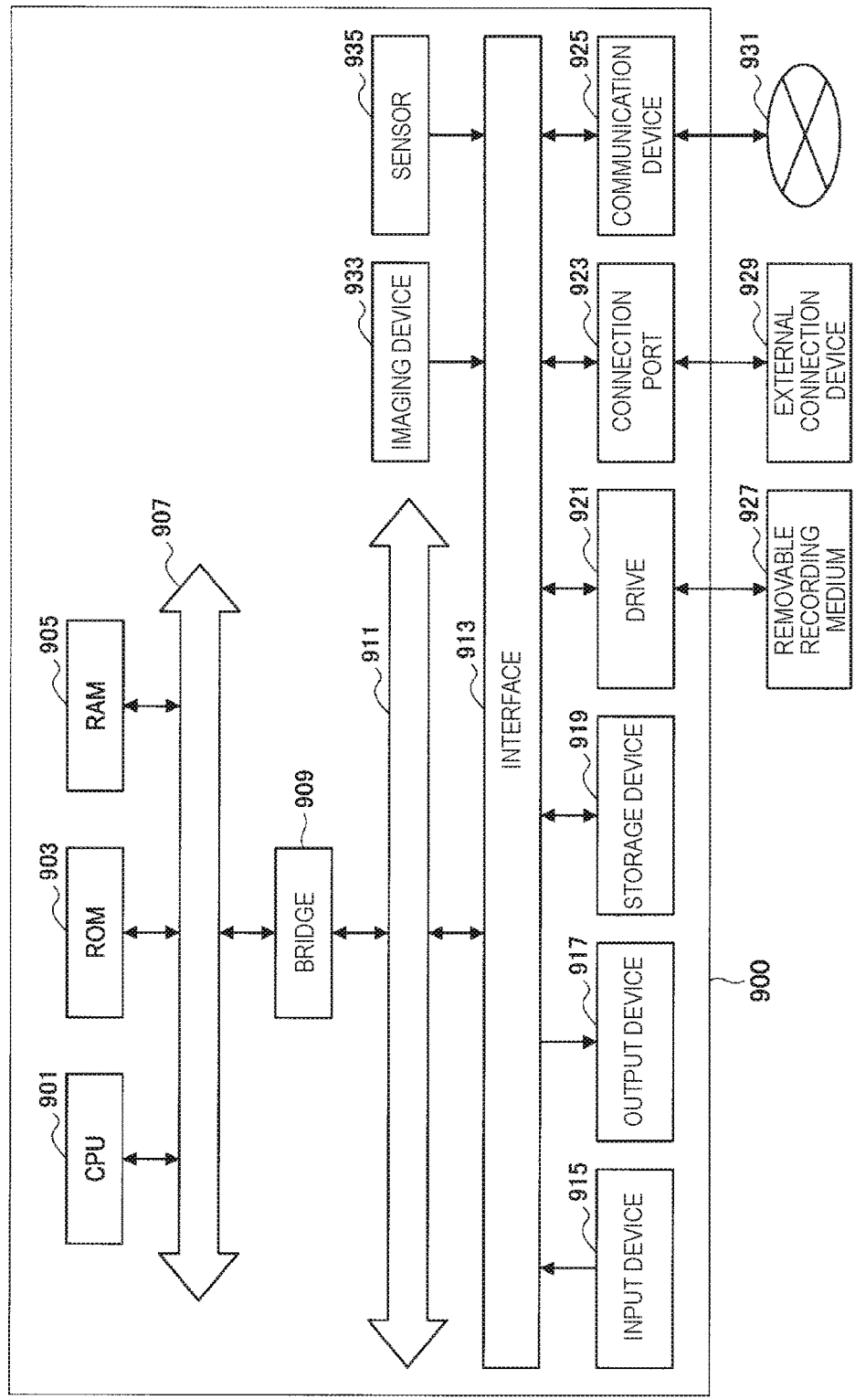
FIG. 8 is a block diagram showing a hardware configuration example of an information processing apparatus according to an embodiment of the present disclosure.

Next, with reference to FIG. 8, a hardware configuration of an information processing apparatus according to an embodiment of the present disclosure will be described. FIG. 8 is a block diagram showing a hardware configuration example of an information processing apparatus according to an embodiment of the present disclosure. An information processing apparatus 900 which is shown may achieve the electronic device and the server in the above described embodiments, for example.

The information processing apparatus 900 includes a central processing unit (CPU) 901, read only memory (ROM) 903, and random access memory (RAM) 905. Further, the information processing apparatus 900 may also include a host bus 907, a bridge 909, an external bus 911, an interface 913, an input device 915, an output device 917, a storage device 919, a drive 921, a connection port 923, and a communication device 925. Furthermore, the information processing apparatus 900 may include an imaging device 933 and a sensor 935 as necessary. The information processing apparatus 900 may also include, instead of or along with the CPU 901, a processing circuit such as a digital signal processor (DSP) or an application specific integrated circuit (ASIC).

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 927. The ROM 903 stores programs and arithmetic parameters used by the CPU 901. The RAM 905 primarily stores programs used in execution of the CPU 901 and parameters and the like varying as appropriate during the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, a switch, and a lever Also, the input device 915 may be a remote control device using, for example, infrared light or other radio waves, or may be an external connection device 929 such as a cell phone compatible with the operation of the information processing apparatus 900. The input device 915 includes an input control circuit that generates an input signal on the basis of information input by the user and outputs the input signal to the CPU 901. The user inputs various kinds of data to the information processing apparatus 900 and instructs the information processing apparatus 900 to perform a processing operation by operating the input device 915.

The output device 917 is configured from a device capable of visually or aurally notifying the user of acquired information. For example, the output device 917 may be: a display device such as a liquid crystal display (LCD), a plasma display panel (PDP), or an organic electro-luminescence (EL) display; an audio output device such as a speaker or headphones; or a printer. The output device 917 outputs results obtained by the processing performed by the information processing apparatus 900 as video in the form of text or an image or as audio in the form of audio or sound.

The storage device 919 is a device for storing data configured as an example of a storage unit of the information processing apparatus 900. The storage device 919 is configured from, for example, a magnetic storage device such as a hard disk drive (HDD), a semiconductor storage device, an optical storage device, or a magneto-optical storage device. This storage device 919 stores programs to be executed by the CPU 901, various data, and various data obtained from the outside.

The drive 921 is a reader/writer for the removable recording medium 927 such as a magnetic disk, an optical disc, a magneto-optical disk, or a semiconductor memory, and is built in or externally attached to the information processing apparatus 900. The drive 921 reads out information recorded on the attached removable recording medium 927, and outputs the information to the RAM 905. Further, the drive 921 writes the record on the attached removable recording medium 927.

The connection port 923 is a port for allowing devices to directly connect to the information processing apparatus

900. Examples of the connection port 923 include a universal serial bus (USB) port, an IEEE1394 port, and a small computer system interface (SCSI) port. Other examples of the connection port 923 may include an RS-232C port, an optical audio terminal, and a high-definition multimedia interface (HDMI) (registered trademark) port. The connection of the external connection device 929 to the connection port 923 may enable the various data exchange between the information processing apparatus 900 and the external connection device 929.

The communication device 925 is a communication interface configured from, for example, a communication device for establishing a connection to a communication network 931. The communication device 925 is, for example, a wired or wireless local area network (LAN), Bluetooth (registered trademark), a communication card for wireless USB (WUSB), or the like. Alternatively, the communication device 925 may be a router for optical communication, a router for asymmetric digital subscriber line (ADSL), a modem for various communications, or the like. The communication device 925 can transmit and receive signals and the like using a certain protocol such as TCP/IP on the Internet and with other communication devices, for example. The communication network 931 connected to the communication device 925 is configured from a network which is connected via wire or wirelessly and is, for example, the Internet, a home-use LAN, infrared communication, radio wave communication, and satellite communication.

The imaging device 933 is a device which images a real space by use of various members including an image sensor such as a charge coupled device (CCD) or a complementary metal oxide semiconductor (CMOS) and a lens for controlling image formation of a subject on the image sensor, and generates a pickup image. The imaging device 933 may image a still image or a moving image.

The sensor 935 is any of various sensors such as an acceleration sensor, a gyro sensor, a magnetic field sensor, an optical sensor, and a sound sensor. For example, the sensor 935 acquires information related to the state of the information processing apparatus 900 itself, such as the posture of the housing of the information processing apparatus 900, or information related to the peripheral environment of the information processing, apparatus 900, such as the brightness or noise around the information processing apparatus 900. Further, the sensor 935 may include a global positioning system (GPS) sensor which measures the latitude, the longitude, and the altitude of the apparatus by receiving a GPS.

Heretofore, an example of the hardware configuration of the information processing apparatus 900 has been shown. Each of the structural elements described above may be configured using a general-purpose material, or may be configured from hardware dedicated to the function of each structural element. The configuration may be changed as appropriate according to the technical level at the time of carrying out embodiments.

(4. Supplement)

The embodiments of the present disclosure may include the information processing apparatus (electronic device), the system, the information processing method executed in the information processing apparatus or the system, the program for causing the information processing apparatus to function, and the non-transitory tangible media having the program recorded thereon, which have been described above, for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not imitative. In other words, the technology according to the present disclosure can exhibit other effects that are evident to those skilled in the art along with or instead of the effects based on the present specification.

Additionally, the present technology may also be configured as below.

(1)

An information processing apparatus including:

a request acquiring part configured to acquire a request to a system;

a response determining part configured to determine a response to the request;

a device selecting part configured to select, on the basis of at least an attribute of the response, a device that provides the response among devices included in the system; and a device controller configured to perform control that causes the selected device to provide the response.

(2)

The information processing apparatus according to (1), wherein the attribute of the response includes a target to which the response is to be provided, and the device selecting part selects, on the basis of a location of the target and locations of the devices included in the system, a device that provides the response.

(3)

The information processing apparatus according to (2), wherein the device selecting part selects a device located close to the target.

(4)

The information processing apparatus according to (2) or (3), wherein the device selecting part reselects a device that provides the response when there is a change in at least any of the target, location of the target, or locations of the devices included in the system.

(5)

The information processing apparatus according to any one of (1) to (4), wherein the attribute of the response includes functions to be achieved by the response, and the device selecting part selects, on the basis of performance with regard to the functions of the devices included in the system, a device that provides the response.

(6)

The information processing apparatus according to any one of (1) to (5), wherein the functions to be achieved by the response include a first function and a second function, and the device selecting part selects a first device achieving the first function and a second device achieving the second function.

(7)

The information processing apparatus according to (6), wherein the functions to be achieved by the response include playback of video content, the device selecting part selects the first device displaying images of the video content and the second device outputting audio of the video content, and the device controller performs control that displays the images of the video content on the first device, and also mutes the audio of the video content.

(8)

The information processing apparatus according to any one of (1) to (7), wherein the attribute of the response includes a target to which the response is to be provided, and the device selecting part selects, on the basis of preference of a user who is the target, a device that provides the response.

(9)

The information processing apparatus according to any one of (1) to (8), wherein the device controller performs control that causes a device to which the request has been input to request additional information for selecting a device that provides the response (10)

The information processing apparatus according to any one of (1) to (9), wherein the device controller performs control that causes a device to which the request has been input to notify that a response has been provided by the selected device.

(11)

An information processing method including:

acquiring a request to a system;

determining a response to the request;

selecting, on the basis of at least an attribute of the response, a device that provides the response among devices included in the system; and performing control that causes the selected device to provide the response.

(12)

A program for causing a computer to achieve:

a function of acquiring a request to a system;

a function of determining a response to the request;

a function of selecting, on the basis of at least an attribute of the response, a device that provides the response among devices included in the system; and a function of performing control that causes the selected device to provide the response.

REFERENCE SIGNS LIST 10 system
100 electronic device
110 image/audio output part
120 image/audio acquiring part
130 operation part
140 controller
150 communication part
160 storage
200 network
300 server
310 controller
320 communication part
330 storage
510 request acquiring part
520 response determining part
550 device selecting part
580 device controller

The invention claimed is:

1. An information processing apparatus comprising:
 circuitry configured to:
  acquire a request to a system;
  determine a response to the request;
  select a device that provides the response among devices included in the system on the basis of at least an attribute of the response, wherein the attribute of the response includes functions to be achieved by the response; and
  transmit at least one control command that causes the selected device to provide the response,
 wherein the request does not explicitly include selection of any device to provide the response.

2. The information processing apparatus according to claim 1, wherein the request is input to the selected device.

3. The information processing apparatus according to claim 1, wherein the request is input to another device among the devices included in the system.

4. The information processing apparatus according to claim 1, wherein the circuitry is further configured to select a plurality of devices that provide the response, from among the devices included in the system, on the basis of at least the attribute of the response.

5. The information processing apparatus according to claim 1, wherein the request to the system is acquired from an input by a user.

6. The information processing apparatus according to claim 5, wherein the attribute of the response includes a target to which the response is to be provided, and
 the circuity is further configured to:
  select, based on a preference of another user who is the target, a device that provides the response.

7. The information processing apparatus according to claim 6, wherein the circuity is further configured to:
  select, based on a location of the another user and locations of the devices included in the system, a device that provides the response.

8. The information processing apparatus according to claim 6, wherein the circuity is further configured to:
  select a device closest to the another user as the device that provides the response.

9. The information processing apparatus according to claim 1, wherein at least one device of the devices included in the system has at least one owner set thereto.

10. The information processing apparatus according to claim 9, wherein when access to the devices included in the system is limited by the owners, a group of devices available to the user includes at least one device, among the devices included in the system, to which the user has been granted access rights.

11. The information processing apparatus according to claim 9, wherein the at least one owner of the at least one device indicates at least one user accessible to the at least one device.

12. The information processing apparatus according to claim 6, wherein the circuitry is further configured to:
  exclude from selection, when selecting the device that provides the response from among the devices included in the system, devices, among the devices included in the system, in which the user and the another user are not owners.

13. The information processing apparatus according to claim 1, wherein the request does not explicitly include selection of any specifically designated device to provide the response.

14. The information processing apparatus according to claim 1, wherein the request does not explicitly designate any specific device to provide the response.

15. An information processing method comprising:
- acquiring a request to a system;
- determining a response to the request;
- selecting a device that provides the response among devices included in the system on the basis of at least an attribute of the response, wherein the attribute of the response includes functions to be achieved by the response; and
- transmitting at least one control command that causes the selected device to provide the response,
- wherein the request does not explicitly include selection of any device to provide the response.

16. A non-transitory computer-readable medium having embodied thereon a program, which when executed by a computer causes the computer to execute a method, the method comprising:
- acquiring a request to a system;
- determining a response to the request;
- selecting a device that provides the response among devices included in the system on the basis of at least an attribute of the response, wherein the attribute of the response includes functions to be achieved by the response; and
- transmitting at least one control command that causes the selected device to provide the response,
- wherein the request does not explicitly include selection of any device to provide the response.

* * * * *